United States Patent
Cao et al.

(10) Patent No.: US 9,313,794 B2
(45) Date of Patent: Apr. 12, 2016

(54) INTER-CELL INTERFERENCE MITIGATION

(71) Applicant: Kabushiki Kaisha Toshiba, Minato-ku (JP)

(72) Inventors: Fengming Cao, Bristol (GB); Rudzi Dziyauddin, Bristol (GB); Tsuguhide Aoki, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 61 days.

(21) Appl. No.: 14/050,492

(22) Filed: Oct. 10, 2013

(65) Prior Publication Data

US 2014/0106765 A1    Apr. 17, 2014

(30) Foreign Application Priority Data

Oct. 12, 2012 (GB) .................................. 1218388

(51) Int. Cl.
*H04W 16/10* (2009.01)
*H04W 72/08* (2009.01)
*H04W 72/10* (2009.01)

(52) U.S. Cl.
CPC ............ *H04W 72/082* (2013.01); *H04W 72/10* (2013.01)

(58) Field of Classification Search
CPC .................................................... H04W 16/10
USPC .................... 455/450, 451, 452.1, 452.2, 453
See application file for complete search history.

(56) References Cited

U.S. PATENT DOCUMENTS

2002/0098860 A1 * 7/2002 Pecen et al. .................... 455/522
2012/0252470 A1   10/2012 Wong et al.

FOREIGN PATENT DOCUMENTS

| JP | 2011-041084 A | 2/2011 |
| JP | 2011-055497 A | 3/2011 |
| WO | WO 2010/139847 A1 | 12/2010 |

OTHER PUBLICATIONS

United Kingdom Search Report Issued Feb. 18, 2013 in GB 1218388. 5, filed on Oct. 12, 2012 (with written opinion).
Office Action issued Sep. 24, 2014 in Japanese Patent Application No. 2013-215131 (with English language translation).

* cited by examiner

*Primary Examiner* — Christopher M Brandt
(74) *Attorney, Agent, or Firm* — Oblon, McClelland, Maier & Neustadt, L.L.P.

(57) ABSTRACT

Allocation of terminal stations to communications channels is carried out on the basis of a selection criterion. Allocation takes account of whether the terminal station is in an edge region of a cell. If so, then the list of terminal stations to be allocated is modified, to account for any interference risk from other base stations.

19 Claims, 9 Drawing Sheets

INTER-CELL INTERFERENCE MITIGATION

CROSS REFERENCE TO RELATED APPLICATION

This application is based upon and claims the benefit of priority from United Kingdom patent application number 1218388.5 filed on 12 Oct. 2012, the entire contents of which are incorporated herein by reference.

FIELD

Embodiments described herein relate to the provision of a cellular communications network in which provision is made to mitigate inter-cell interference.

BACKGROUND

Cellular wireless communications have been long established in the field. So-called macro-cells are defined by the effective range of operation of base stations deployed in an area of coverage. By spacing base stations apart, a pattern of macro-cells can be established.

To meet increases in traffic demand, it is known to split existing macro-cells by provision of further base stations, leading to smaller macro-cells. Additionally, a single macro-cell may in fact be generated by angularly spaced antennas, each covering a portion of the coverage region. In existing implementations, three antennas may be spaced 120° apart. These three antennas may be thought of as defining separate sub-regions of a cell.

If a new cellular technology were to be deployed from scratch, backwards compatibility with existing technologies and installations would not be required. In such a case, macro-cells might be deployed at a finer spacing than in existing deployments, thereby leading to smaller macro-cells.

These homogeneous arrangements all involve the provision of a plurality of macro-cells, all of substantially the same communications technology. Other communications technologies might be overlaid on the macro-cell deployment. For instance, an indoor environment might present particular technical challenge to a macro-cell deployment, in that EMC shielding effects and other interferences might preclude effective macro-cell coverage. Thus, a smaller scale indoor solution, overlaid on the macro-cell structure, may provide enhanced coverage.

Heterogeneous arrangements, for instance consisting of a macro-cell network, and smaller cells defined perhaps by lower power base stations, and perhaps of a different communications technology, can now be encountered.

While the smaller cells so provided can deliver improved spatial diversity, thereby enhancing system capacity, certain technical challenges can arise in certain circumstances. A notable issue is that of inter-cell interference, particularly where a user station (User Equipment, UE) is positioned at or near a boundary between two cells. In such a situation, the UE, operating in a particular cell, may experience interference from communications within another, adjoining cell. While this problem is known and well understood, its prevalence will be increased in the context of cells of reduced size, with correspondingly increased boundary situations.

One well known approach to mitigating inter-cell interference is the re-use of frequencies. One possible technique comprises the imposition of a rule that two adjacent cells use mutually orthogonal frequencies. This approach can, in general, completely eliminate inter-cell interference, but at the cost of lower spectrum efficiency.

Instead of using different frequencies per cell, fractional frequency reuse (FFR) involves dividing user terminals into two groups, central cell user terminals and cell edge user terminals. In FFR, frequency reuse is only employed for cell edge user terminals, as these are the only user terminals which risk encountering inter-cell interference. Central cell user terminals in adjacent cells can use the same frequency. FFR can improve spectrum efficiency and mitigate inter-cell interference, but it still has certain drawbacks.

Firstly, the frequencies used for cell edge user terminals are pre-determined, and it is difficult therefore to adapt to external factors, such as environmental conditions, or a change in the number of UEs classed as cell-edge user terminals (bearing in mind that a UE has the potential for mobility). This is because the interfaces between the base stations normally need to be delay tolerant, and also the interfaces can only support very low transmission rates, which makes it impractical to make frequent changes to the predefined frequencies used for cell edge user terminals.

Secondly, two schedulers are required in order to schedule central cell user terminals and cell edge user terminals separately.

DETAILED DESCRIPTION

Figure 1:
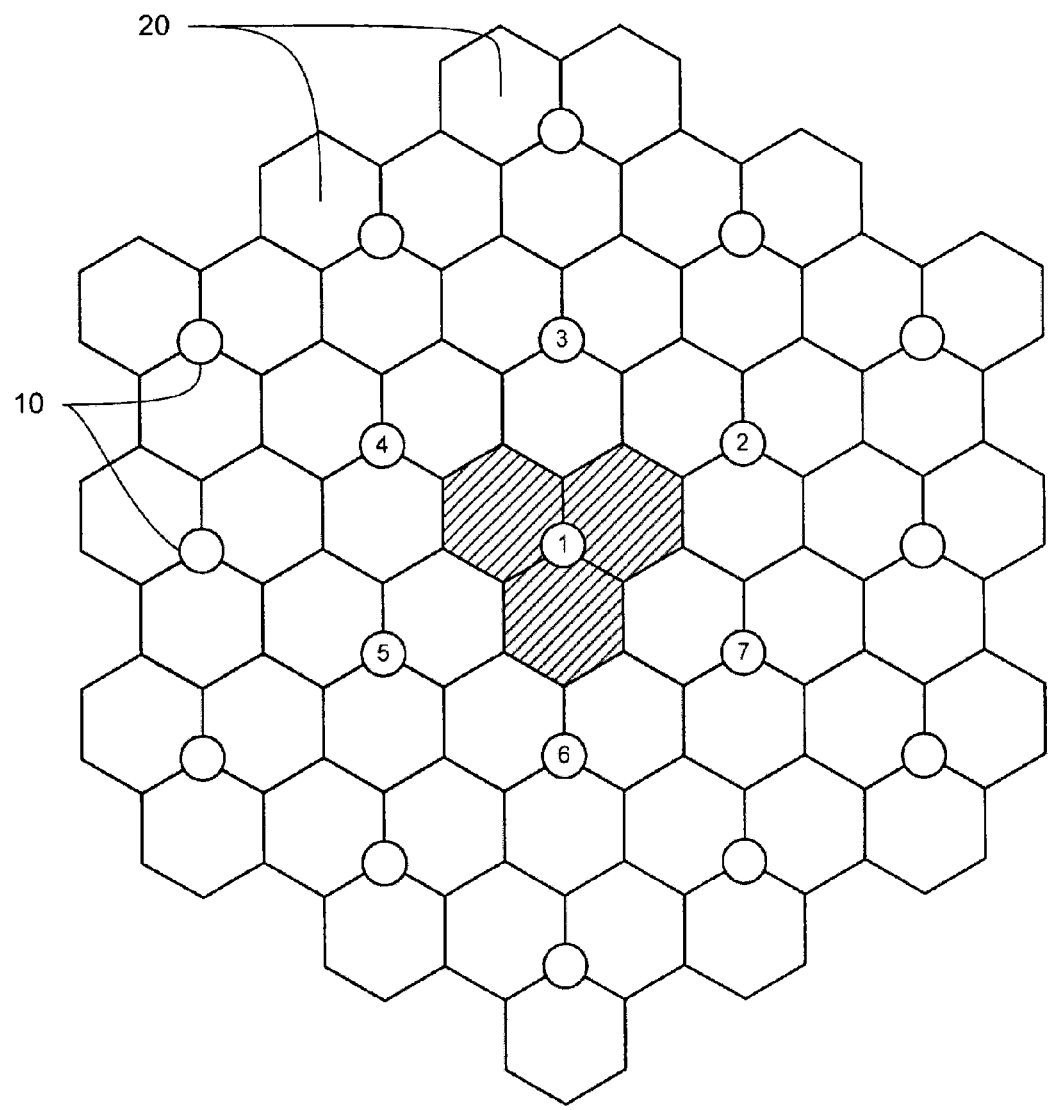
FIG. 1 is a schematic diagram of a macro-cell operating environment in which a described embodiment is demonstrated.

An embodiment described herein provides a control unit for controlling communication in a cellular wireless communications network comprising a plurality of base stations, each base station of the network defining a cell wherein a base station is capable of effecting wireless communication with terminal stations located within the cell associated with that base station, each base station being capable of effecting wireless communication with an associated terminal station on a communication channel of a plurality of communication channels defined in a wireless communication medium, the control unit comprising storage means storing, for each base station, terminal station information for one or more terminal stations associated with that base station, the terminal station information comprising classification information identifying a classification of the terminal station, the classification being one of a first classification associated with an edge region of its associated cell, or a second classification associated with a central region of its associated cell, utility information for the terminal station, the utility information describing performance capability of that terminal station, and, if the classification information is indicative of the first classification, the storage means further storing interference risk information identifying any of the other base stations that present an interference risk to the performance of the terminal station, and allocation means operable to allocate one or more of said terminal stations to a communications channel, the allocation means being configured to determine a list of terminal stations available for allocation, initially each terminal station identified in the list being that terminal station, for each base station, with the highest performance capability in its associated base station of the terminal stations identified in the stored information, the allocation means being further configured to identify a terminal station from the list on the basis of a selection criterion, to allocate that identified terminal station to a communications channel, and thereafter to modify the list to remove therefrom the allocated terminal station and, if the allocated terminal station is in the first classification, to modify the list to take account of any terminal station identified in the list which, on the basis of the stored interference risk information, presents an interference risk to the allocated terminal station.

Embodiments described herein further provide a method of controlling communication in a cellular wireless communications network comprising a plurality of base stations, each base station of the network defining a cell wherein a base station is capable of effecting wireless communication with terminal stations located within the cell associated with that base station, each base station being capable of effecting wireless communication with an associated terminal station on a communication channel of a plurality of communication channels defined in a wireless communication medium, the method comprising storing, for each base station, terminal station information for one or more terminal stations associated with that base station, the terminal station information comprising classification information identifying a classification of the terminal station, the classification being one of a first classification associated with an edge region of its associated cell, or a second classification associated with a central region of its associated cell, utility information for the terminal station, the utility information describing performance capability of that terminal station, and, if the classification information is indicative of the first classification, further storing interference risk information identifying any of the other base stations that present an interference risk to the performance of the terminal station; and allocating one or more of said terminal stations to a communications channel, the allocating comprising determining a list of terminal stations available for allocation, initially each terminal station identified in the list being that terminal station, for each base station, with the highest performance capability in its associated base station of the terminal stations identified in the stored information, identifying a terminal station from the list on the basis of a selection criterion, allocating that identified terminal station to a communications channel, and thereafter modifying the list to remove therefrom the allocated terminal station and, if the allocated terminal station is in the first classification, modifying the list to take account of any terminal station identified in the list which, on the basis of the stored interference risk information, presents an interference risk to the allocated terminal station.

Taking into account the general trend towards reduction in the size of cell defined in a cellular network, an embodiment described herein involves deployment of a central control unit which physically connects base stations directly. This may be especially useful in the case wherein base stations are deployed within an indoor environment, such as an office building. This additional central control unit can support prompt high-rate signalling exchanges between base stations and the central control unit, which enables dynamic frequency re-use. Dynamic frequency re-use, as described herein, involves dynamically allocating, resource block by resource block, frequencies for cell edge user terminals in adjacent cells, the allocating being adaptive to the radio environment.

FIG. 1 illustrates a macro-cell operating environment to provide background to the presently described embodiment. The operating environment comprises a plurality of macro-cells 20 each defined by a macro-cell base station 10. Seven of the macro-cell base stations 10 are numbered 1-7.

Figure 2:
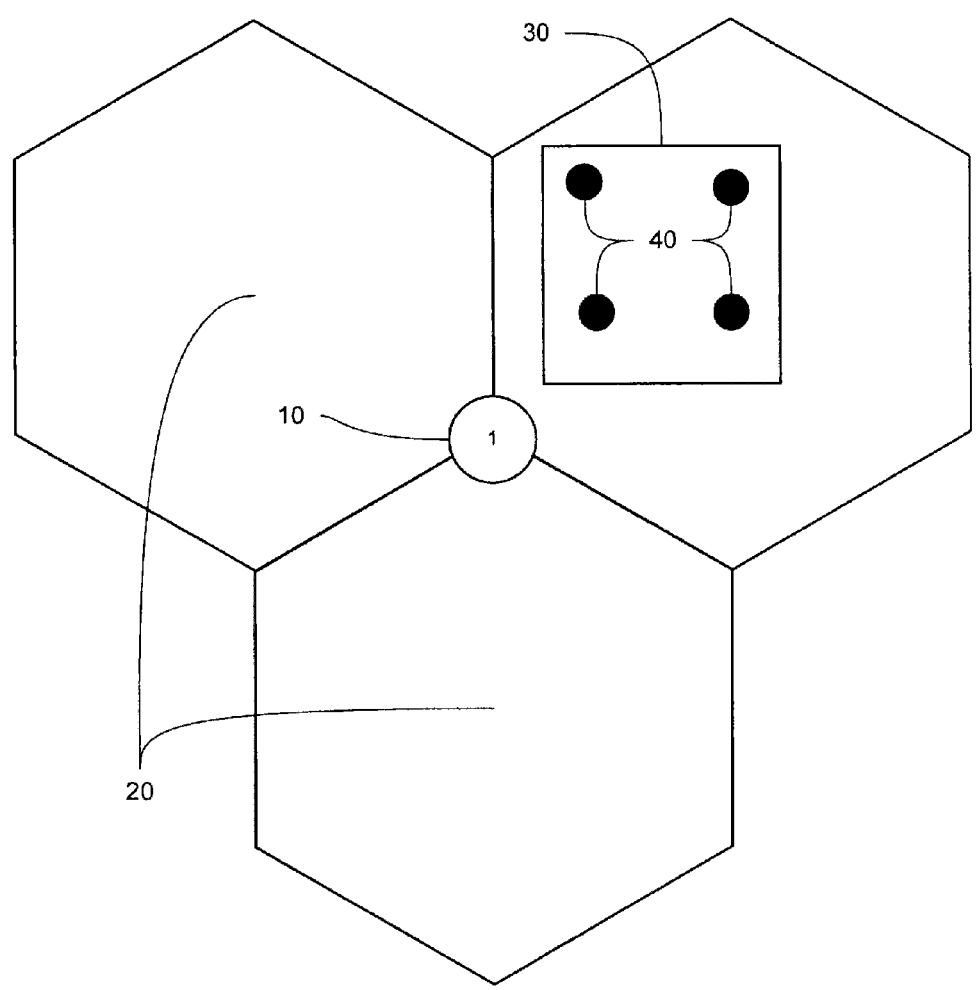
FIG. 2 is a schematic diagram of a macro-cell within the operating environment illustrated in FIG. 1.

As illustrated further in FIG. 2, each macro-cell base station 10 provides coverage to three macro-cells 20. This is brought about, in a conventional manner, by antenna equipment relatively spaced at 120°. By the suitable, regular, deployment of macro-cell base stations 10, a regular pattern of hexagonal cells is established in a given network coverage area.

It will be noted that, at the boundary between two macro-cells 20, it will be entirely possible that more than one of the macro-cell base stations 10 will be within range of a mobile device. The boundaries are not intended to create an impression of a hard cut-off in coverage by any particular macro-cell base station 10, and the reader will appreciate that the range of coverage by a macro-cell base station 10 can depend on a number of inherent or transient external factors, such as UE sensitivity, climatic conditions, presence or absence of other interference sources, and so on. However, the lines drawn in FIG. 1 are intended to provide an impression of cellular coverage, as will be understood by the reader.

Figure 3:
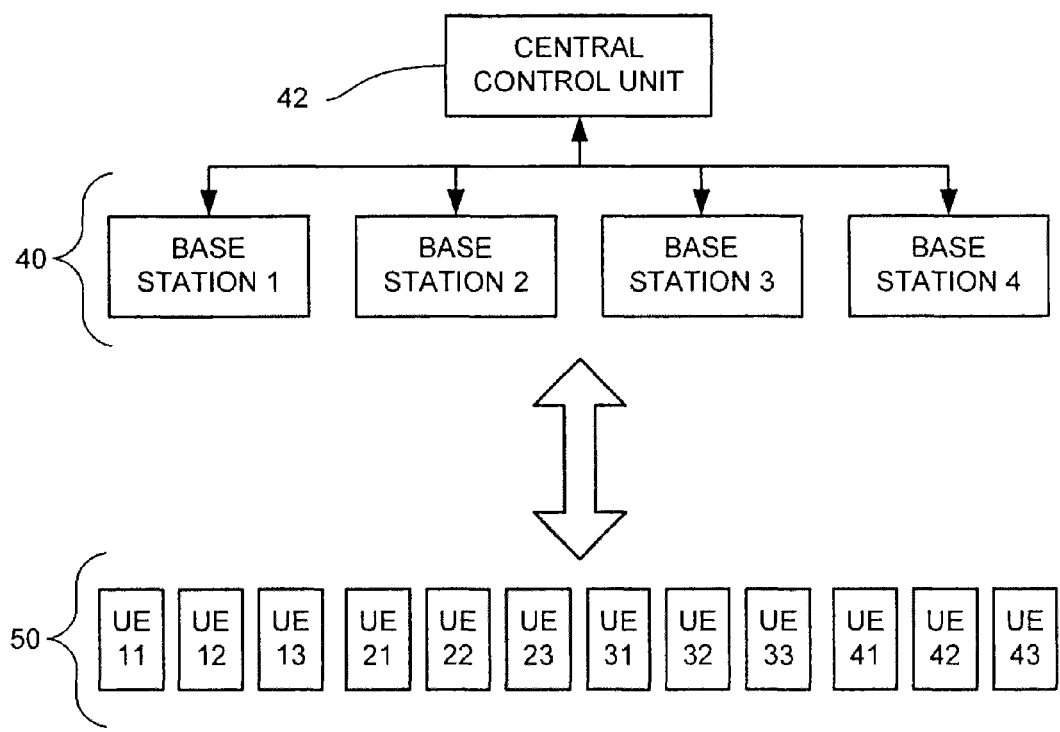
FIG. 3 is a schematic diagram of architecture of a network within the operating environment illustrated in FIGS. 1 and 2.

A building 30 is located within range of one of the macro-cell base stations 10 (hereinafter referred to as station 10-1). Inside the building 30, four base stations 40-1, 40-2, 40-3 and 40-4 are deployed. These base stations 40 are configured for short range wireless communications coverage, within the building. As illustrated in FIG. 3, the base stations 40 are connected to a central control unit 42. In this embodiment, the connection between the base stations 40 and the central control unit 42 is effected by wired communications (a term encompassing, but not limited to, powerline communication, hard-wired Ethernet communication, and fibre optic communication) though the reader will appreciate that other modes of communication, such as wireless communication, may also be considered.

As illustrated further in FIG. 3, a plurality of devices 50 (denoted "UE", or "user equipment" in the usual manner) are provided. While these UE devices are provided with indices n1, n2, n3, where n corresponds to the respective indices of adjacent base stations, it will be appreciated that the potential mobility of such UE devices 50 does not tie a particular UE device 50 to a particular base station 40 in perpetuity.

Each UE device 50 establishes communication with a particular base station 40, in a manner to be described in due course. Each base station 40 itself establishes communication with macro-cell base station 10-1 as indicated in FIG. 2.

Figure 4:
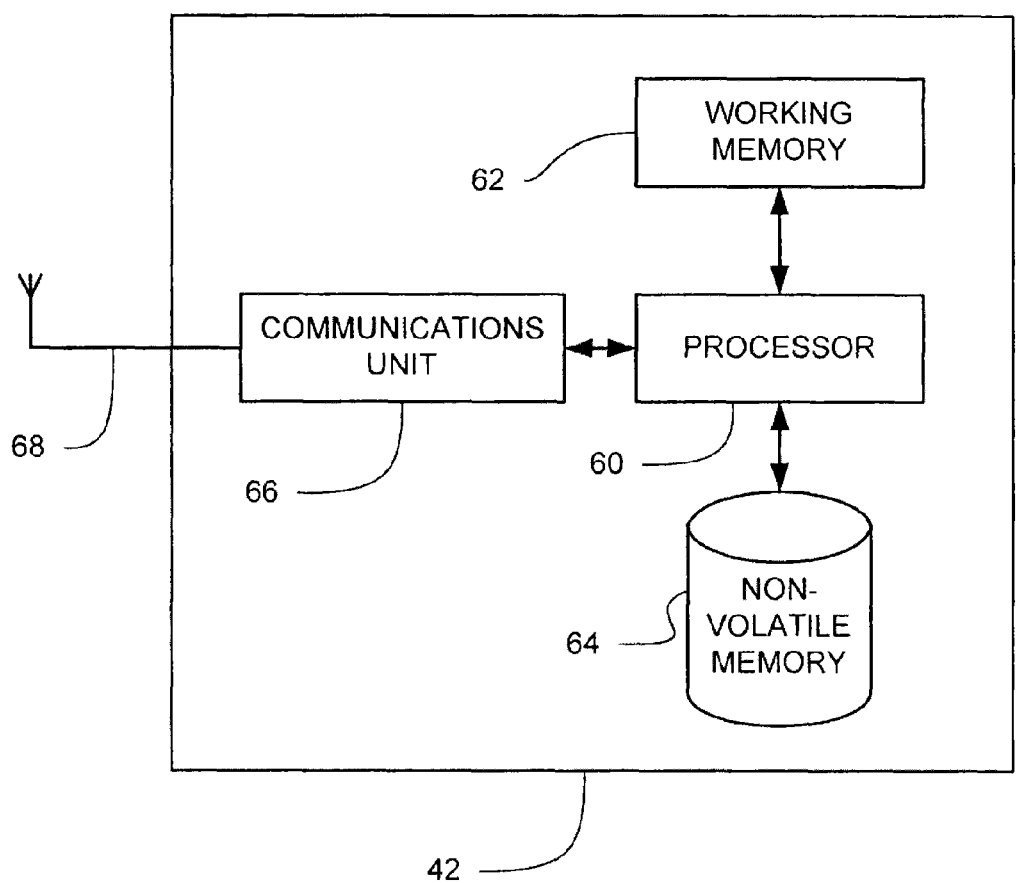
FIG. 4 is a schematic diagram of a control unit of the network illustrated in FIG. 3.

The control unit 42 is illustrated in FIG. 4 in further detail. In simple terms, the central control unit 42 is a computer, comprising a processor 60 with access to a working memory 62 and a non-volatile mass storage memory 64. A dedicated communications unit 66 is also provided, to establish wireless communications via antenna 68.

The function of the control unit 42 is thus governed by software. Such software may be stored in the non-volatile memory, and may be introduced ab initio or loaded into the control unit 42 as an update to existing software. The software may be a directly executable application, or may comprises instructions executable through an interface such as an operating system. The software may comprise a product capable of providing all intended functionality for the control unit 42, or may comprise calls and references to other software and/or hardware facilities which can be assumed to pre-exist on the control unit 42, such as in the form of dynamically linked libraries (dll).

External control of the control unit 42 is not illustrated, but may be provided in one of many different ways. For instance, a facility may be provided for direct connection of user input devices, such as a keyboard, mouse or the like, and a display output may be provided through provision of a display driver. Alternatively, provision may be made for connection, such as via Ethernet or USB port connection, to another computer such as a PC. Through this, configuration and control of the control unit 42 may be effected. This is similar to the manner in which WIFI base stations are currently configured by user terminals.

On execution of suitable software, the control unit 42 effects control of adaptive frequency reuse among the UEs 50 with the base stations 40, in accordance with this described embodiment. The manner in which this is achieved will now be described, with reference to FIG. 5, which shows a first example of a method of scheduling for use in communication between base stations 40 and UEs 50.

The central control unit 42 coordinates the base stations 40 to decide which user terminal will be transmitted using a given resource block. It should be noted that the present example is a multi-channel system, where the channel can be a resource block as defined as in the LTE or WiMAX system or merely a subcarrier in a OFDM-based system. The term "resource block" used in the following description is for illustration only.

In the following description, I is the number of the cells, and N is the number of the total resource blocks to be transmitted.

In step S1-2, for each cell i, (0<i≤I), the UEs in the cell are divided into two groups, cell central user terminal group $U_i^{cc}$ and cell edge user terminal group $U_i^{ed}$. The UEs in $U_i^{cc}$ are are cell central user terminals and those in $U_i^{ed}$ are cell edge user terminals. For each UE in $U_i^{ed}$, the neighbouring cell which is the dominant source of interference is identified. The dominant interfering neighbouring cell for UE k in cell i is denoted $S_i^k$.

For a given UE k in cell i, if the received power from the base station of the serving cell $D_{i,i}^k$, minus the received power from the base station of a given neighbouring cell $D_{i,j}^k$, is less than a given threshold γ, then the given neighbouring cell will be a dominant interfering cell for that UE. That is:

For $\forall j (0<j\leq I, j\neq i)$, if $D_{i,i}^k - D_{i,j}^k < \gamma$

Then $j \in U_i^{ed}$

For a given UE k in cell i, if the SINR of the UE without interference from a given neighbouring cell is greater than a threshold, while the SINR of the UE with the interference from the given neighbouring cell is less than the threshold, then the given neighbouring cell will be a dominant interfering cell for that UE.

Figure 6:
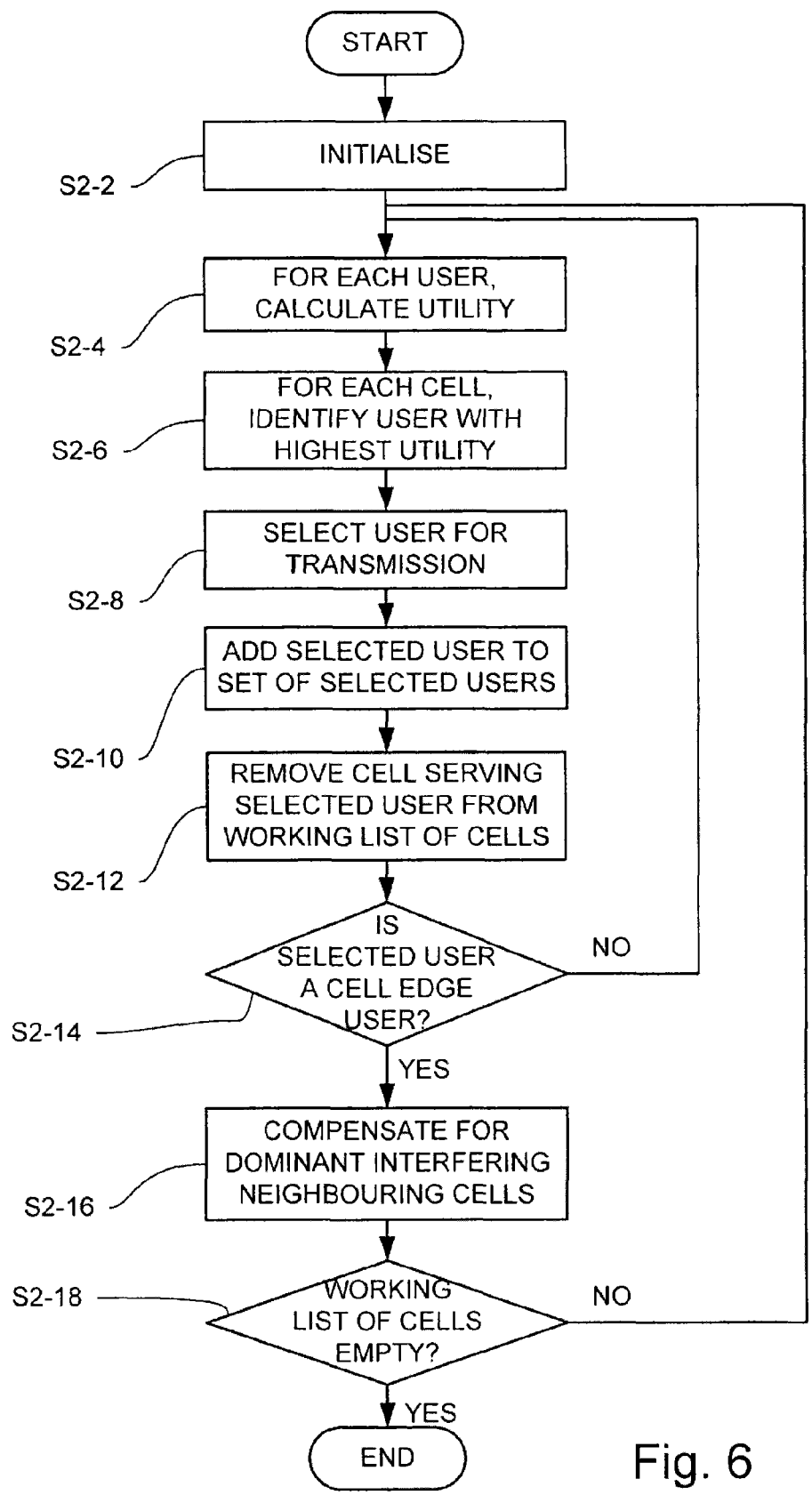
FIG. 6 is a flow diagram for a user terminal selection process of the first example.

Then, in step S1-4, once the dominant interfering cells for each cell edge UE have been identified, the UEs are scheduled iteratively. This is illustrated in further detail in FIG. 6.

The scheduling commences in step S2-2 by initialising:
Ω—the set of all cells
$U_i$—the set of user terminals in cell i, where i ∈ Ω and $U_i = U_i^{cc} \cup U_i^{ed}$
535—the set of user terminals to be chosen at the resource block, initiated as a null set In step S2-4, for each user terminal in each cell k ∈ $U_i$ in Ω, the utility is calculated and, in step S2-6, for each cell in Ω, the user terminal with the highest utility is identified. This is calculated as $$k_i^* = \underset{k \in U_i}{\mathrm{argmax}}(R_i^k) \text{ for } \forall i \in \Omega$$

where $R_i^k$ is the utility of the user terminal k in the cell i, and the user terminal $k_i^*$ in the cell i has highest utility. The utility at a given resource block for each user terminal can be represented by a number of different measures. The present embodiment envisages using achievable transmit rate $R_i^k = r_i^k$ or the ratio of achievable transmit rate over past throughput $$R_i^k = \frac{r_i^k}{T_i^k},$$

where $r_i^k$ and $T_i^k$ are the achievable transmit rate in the given resource block and the past throughput of user k in cell i, respectively where $r_i^k = f(\gamma_i^k)$ obtained from a link-to-system function or look-up table f(·) of the Signal to Interference plus Noise Ratio (SINR) $\gamma_i^k$ which depends on the transmit power and radio channel from its own RU, the transmit power and radio channel from other RUs, and the additive Gaussian noise. However, the reader will appreciate that other measures can be used to describe the relative utility of one device over another.

From the user terminals k: obtained in step S2-8, a user terminal is selected to be transmitted. Three possible selection mechanisms are proposed herein. In the following explanation, the index of the user terminal to be chosen is denoted $k_{i*}^*$, where i* is the index of the cell serving the chosen user terminal.

Option A1

A user terminal is selected whose serving base station has been assigned fewest resource blocks to transmit so far, i.e.:
$k_{i*}^* \mathrm{arg\,max}_{i \in \Omega}(L_i)$
where $L_i$ is the load of resource blocks for cell i Option A2

A user terminal is selected on the basis of having the highest utility:

$$k_{i*}^* = \underset{i \in \Omega}{\mathrm{argmax}}(R_i^{k^*})$$

Option A3

If there are cell edge user terminals, a cell edge user terminal is selected which has highest utility among the cell edge user terminals:

$$k_{i*}^* = \underset{\substack{i \in \Omega \\ k_i^* \in U_i^{ed}}}{\mathrm{argmax}}(R_i^{k^*})$$

otherwise a user terminal is selected on the basis of having highest utility:

$$k_{i*}^* = \underset{i \in \Omega}{\operatorname{argmax}}(R_i^{k^*})$$

Whichever approach is used, in step S2-10, the selected user terminal is added to the set of chosen user terminals £=£∪k$_{i*}$*.

In step S2-12, the cell i* is removed from Ω, i.e. Ω=Ω\i*.

A decision is taken in step S2-14. If the chosen user terminal k$_{i*}$* is not a cell edge user terminal, the routine returns to step S2-4; otherwise, in step S2-16, a compensation takes place for dominant interfering neighbouring cells. This can be by either of the following two approaches.

Option B1

The dominant interfering neighbouring cells of the chosen user terminal k$_{i*}$* are removed, i.e. Ω=Ω\S$_{i*}^{k*}$ Option B2

In each of the dominant interfering neighbouring cells identified for the chosen user terminal k$_{i*}$*, the base station transmits with a lower power at this resource block.

After either option B1 or option B2 for compensating for dominant interfering neighbouring cells, each cell edge user terminal k in each cell of Ω is checked, to determine if the cell i* serving the chosen user terminal k$_{i*}$* is the dominant interfering neighbouring cell of this cell edge user terminal k. If this is the case, then the user terminal k is removed from $U_i^{ed}$, i.e.:

For ∀k ∈ $U_i^{ed}$, ∀i ∈ Ω, if i* ∈ $S_i^k$, then $U_i^{ed}=U_i^{ed}$\k

As indicated by step S2-18, the procedure returns to step S2-4 until all cells have been considered, i.e. there are no cells left in Ω. At that point, the next resource block is considered from step S2-2 onwards.

As indicated, the user terminal scheduling method schedules the user terminals per resource block. At each resource block, the user terminals are selected taking into account either load balance, or total utility. Furthermore, the procedure also mitigates the inter-cell interference by adaptively avoiding the dominant interference to the chosen cell edge user terminals.

Figure 5:
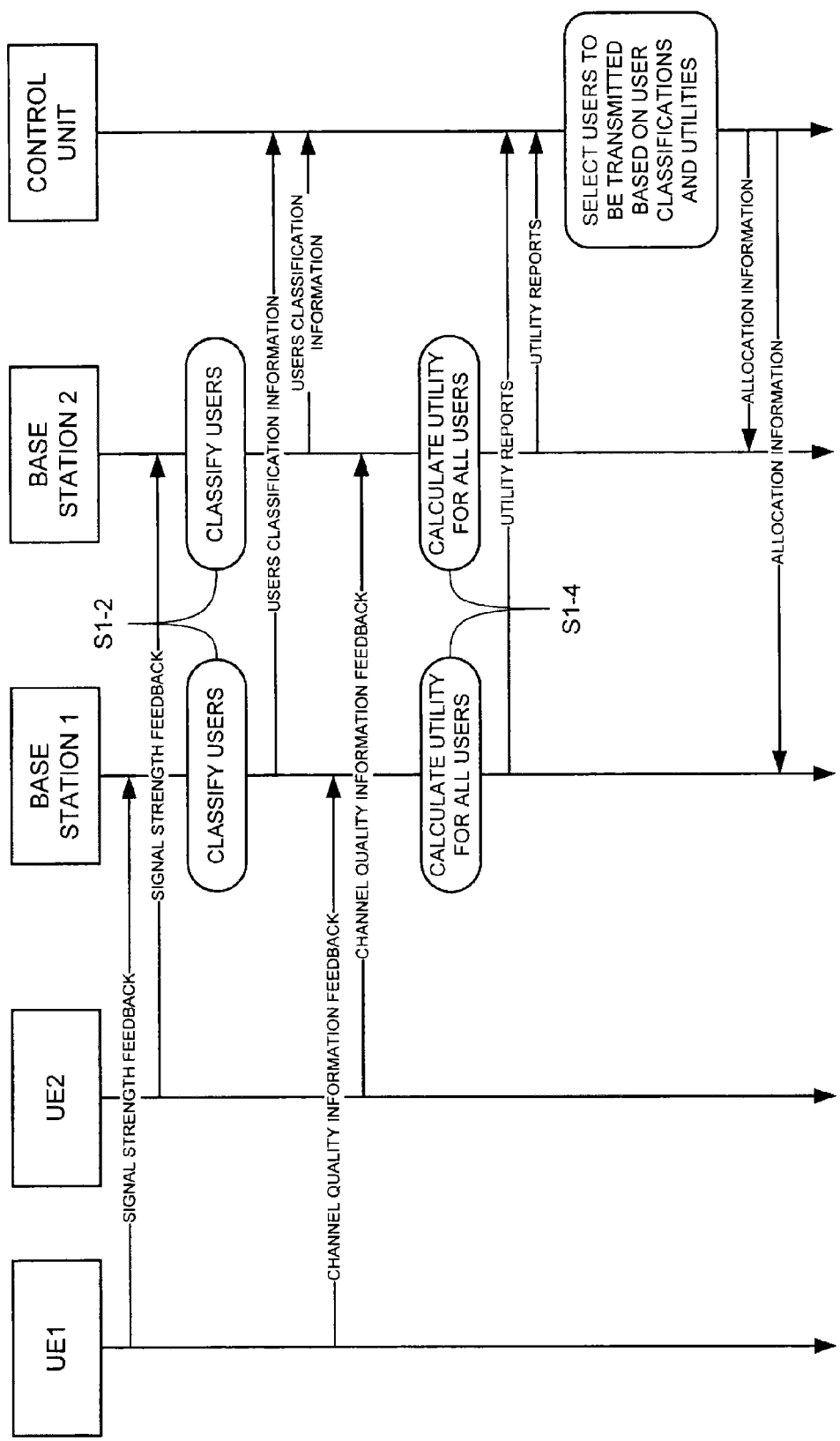
FIG. 5 is a signalling flow diagram for a first example of the described embodiment.

FIG. 5 shows this approach in general terms. For an existing 3GPP LTE system, the reader will appreciate that each base station is an eNB, using the nomenclature of that particular standard. The control unit as illustrated can thus be implemented by a Central Control Unit (CCC) of the same technology.

Figure 7:
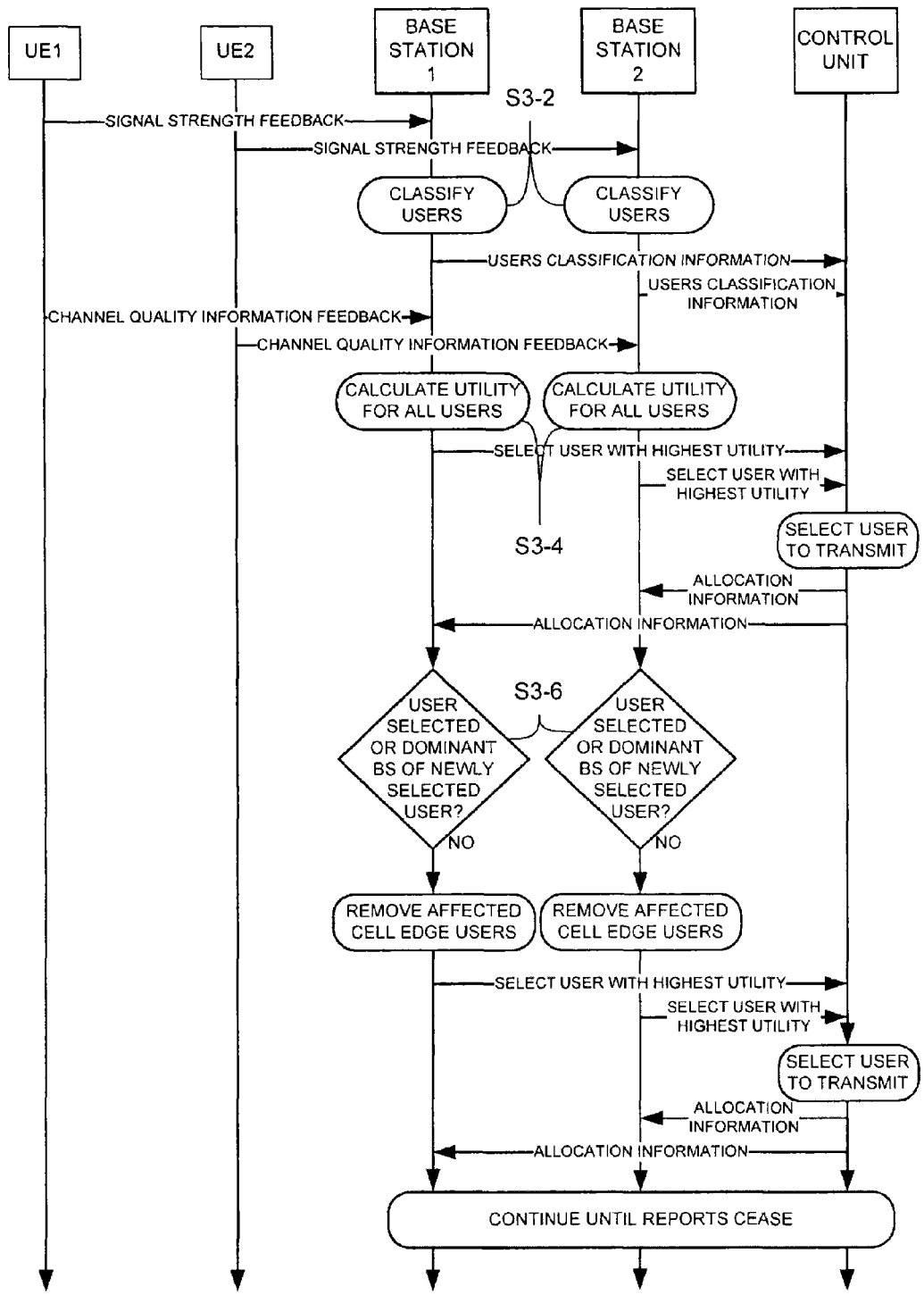
FIG. 7 is a signalling flow diagram for a second example of the described embodiment.

Whereas FIG. 5 illustrates an embodiment of scheduling in a centralised manner, it will be appreciated by the reader that a distributed approach will also be suitable for implementation. FIG. 7 illustrates such an approach.

As shown in FIG. 7, the approach commences in much the same manner as the approach illustrated in FIG. 5. Steps S3-2 and S3-4 are the same as steps S1-2 and S1-4.

However, after each base station has calculated utilities for each of its user terminals, the base station, on a unilateral basis, selects one with the highest utility. The control unit then receives a report from each base station, identifying the user terminal with the highest utility at each base station. The control unit confines its decision on which user terminal should transmit, on these reports—thus, the control unit will only have a choice of one user terminal per base station. Of course, the end result is the same as for the centralised system.

The allocated user terminal is then reported back to each base station. A further decision is then taken, in step S3-6, at each base station. Each base station determines whether the selected user terminal is of that base station, or if that base station is a dominant neighbour of the selected user terminal. If neither of these conditions is satisfied, then the affected cell edge user terminals are removed from further consideration (as in step S2-16 above). Otherwise, that is if either the selected user terminal is associated with that base station, or the base station is a dominant neighbour of the selected user terminal, then the base station reports this back to the Central Control Unit (this latter feature is omitted from FIG. 7 for reasons of clarity).

This process repeats until reports back to the Central Control Unit cease. At that point, the correct allocation of user terminals will have been made.

Figure 8:
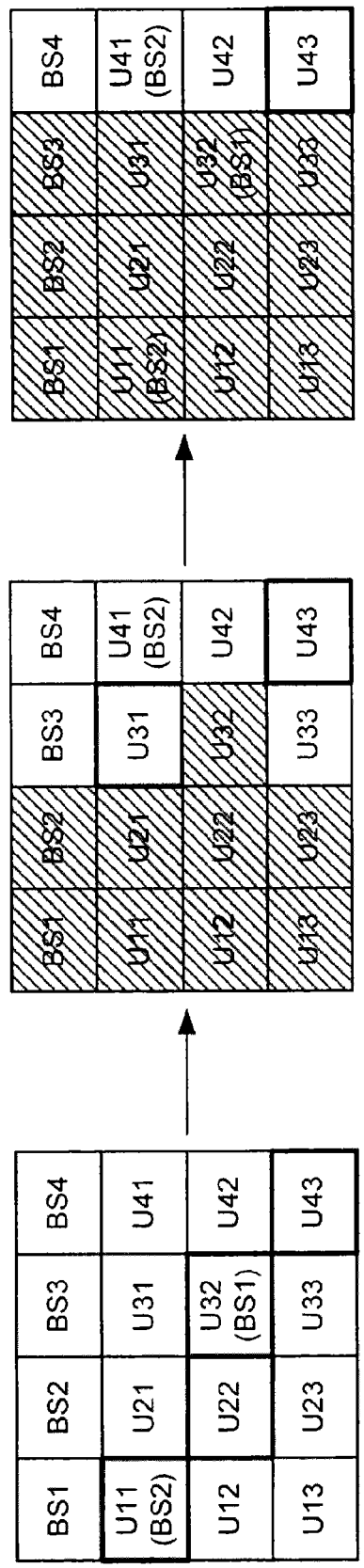
FIG. 8 illustrates a worked example of implementation of the described embodiment.

FIG. 8 illustrates a worked example of the procedure to schedule user terminals in a resource block. In the example, there are four cells defined by base stations (BS1, BS2, BS3 and BS4) and each cell has 3 user terminals. The left hand block illustrates an initial state before resource allocation has taken place. As shown in that block, user terminal UE11 in cell BS1 is a cell edge user terminal with BS2 as a dominant interfering cell (indicated in brackets). Likewise, user terminal U32 in cell BS3 is also a cell edge user terminal whose dominant interfering cell is cell BS1.

The example proceeds on the basis that user terminal U11 in cell BS1, user terminal U22 in cell BS2, user terminal U32 in cell BS3 and user terminal U43 in cell 4 have highest utility within their respective cells. In accordance with the above described embodiments, the central control unit selects a user terminal from the set of highest utility user terminals {U11, U22, U32, U43}, according to one of the criteria in step S2-8. These user terminals are highlighted in FIG. 8 by heavy outline.

In this example, user terminal U11 is selected. BS1 is out of consideration for further iterations, as a user terminal of that BS has been selected. Further, employing Option B1 described above, BS2 is out of consideration, as it is the dominant interfering cell of U11. In addition, cell edge user terminal U32 in cell 3 will also be removed, as it's dominant interfering cell is BS1. Then, by further iteration, the set of selected user terminals is finally determined to be {U11, U31, U43}.

Unlike the previous interference mitigation based on the static or semi-static frequency reuse, embodiments described herein provide an approach to scheduling resources wherein, instead of predefining some dedicated portions of the bandwidth for cell edge user terminals in the static or semi-static frequency reuse, the scheduling of user terminals takes place resource block by resource block. In each resource block, an iterative method is described above to select user terminals to be transmitted and, in each iteration, a user terminal is selected taking into account the inter-cell interference—that is, when a cell edge user terminal is selected in a particular resource block, its dominant interfering cell cannot use this resource block or can only transmit at a lower power level.

The described embodiment reuses the frequency dynamically, at the resource block level, to mitigate interference. This is thus adaptive to changes in radio environment. The described embodiment provides a more efficient interference mitigation method for the network, in which the topology may be irregular and inter-cell interference changes dynamically.

Figure 9:
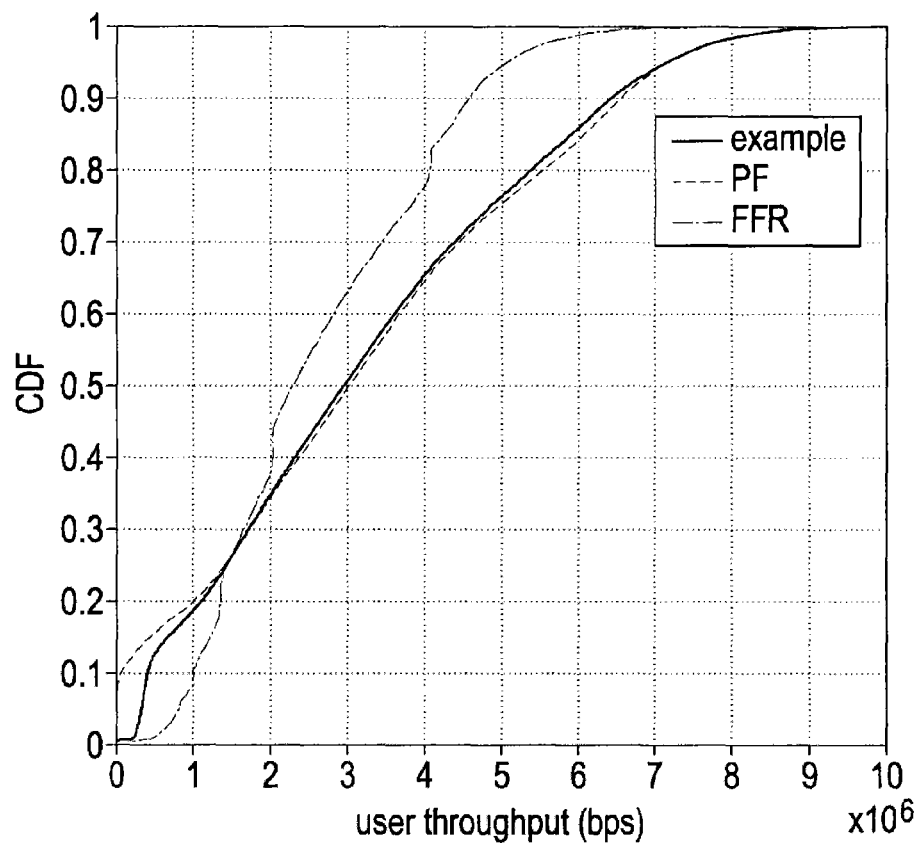
FIG. 9 is a graph of simulation results for an implementation of the described embodiment.

To evaluate system performance of the described embodiment, FIG. 9 illustrates results of simulations carried out on the basis of the network layout illustrated in FIG. 1. As described above, and with reference to the drawing, the network has 19 macro cells. Each macro cell of this example has three sectors. As shown in FIG. 1, the three sectors of an identified base station BS1 are shaded.

In this example, the inter-site or macro BS distance (ISD) is 1732 metres. As shown in FIG. 2, four small BSs are implemented in a building located in the central macro cell. The reader will appreciate that the term "small BS" is known in the art. In this example, the building is substantially 120 m square in plan. Each small BS has two transmit antennas. Each sector is assumed to contain ten user terminals, each of which has two receive antennas. It is assumed that the various units operate on the basis of MRC MIMO.

Figure 10:
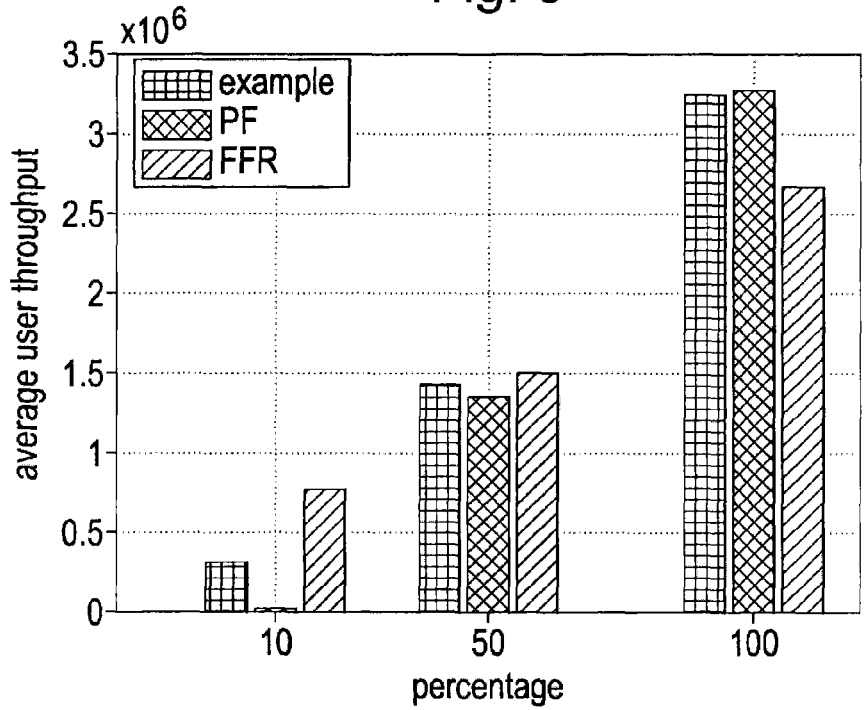
FIG. 10 is a further graph of simulation results for the implementation of the described embodiment.

The system performance in terms of CDF of user terminal throughput and average user terminal throughput is presented in FIG. 9 and FIG. 10. This uses options A3 and B1 described above, although there is no reason to suspect that any of the other options would produce weaker performance.

Typically, the 10% lowest performing of the user terminals will be cell edge user terminals—these will be most affected by the inter-cell interference. The figures show the comparison with conventional proportional fair scheduling and fractional frequency reuse scheme.

From the figures, it can be seen that the described example demonstrates improvement in performance in terms of cell edge user terminal throughput (worst case 10% user terminal throughput), especially compared with the conventional proportional fair scheduling method, while average user terminal throughput is maintained (100% user terminal throughput). FFR can provide better cell edge user terminal performance, but at the cost of greater degradation of the average user terminal throughput. Evidently, the described example is more efficient than previous techniques at providing fairness in resource allocation and in overall performance.

A central control unit, apart from the base stations, is described herein; however, it will be appreciated that the central control unit could be implemented within one of the base stations, the remaining base stations being thereby considered "slave" base stations under the control of a "master" base station. Alternatively, the function of the central control unit could be implemented in a distributed manner by suitably configured base stations operating cooperatively.

While reference is made herein to user equipment (UE), this in no way limits the scope of the above-described embodiments to devices used by users. Any device, employing communications technologies such as envisaged above, including automated equipment, may benefit. Further, the term UE is often used interchangeably with the term "mobile station". Again, nothing herein should be read as limiting application of the embodiments to devices which are mobile. The embodiment might equally be used with devices which are habitually stationary, such as desktop computers, or other equipment connected wirelessly for convenience, such as point-of-sale equipment, or information units for libraries, airports and so on. A more suitable term might be "terminal equipment", or "terminal stations", intended to encompass all devices which might employ communications technologies to communicate with other devices, via a base station.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A controller controlling communication in a cellular wireless communications network comprising a plurality of base stations, each base station of the network defining a cell wherein a base station is capable of effecting wireless communication with terminal stations located within the cell associated with that base station, each base station being capable of effecting wireless communication with an associated terminal station on a communication channel of a plurality of communication channels defined in a wireless communication medium, the control unit comprising:

a memory storing, for each base station, terminal station information for one or more terminal stations associated with that base station, the terminal station information comprising classification information identifying a classification of the terminal station, the classification being one of a first classification associated with an edge region of its associated cell, or a second classification associated with a central region of its associated cell, utility information for the terminal station, the utility information describing performance capability of that terminal station, and, if the classification information is indicative of the first classification, the memory further storing interference risk information identifying any of the other base stations that present an interference risk to the performance of the terminal station;

an allocation processor operable to allocate one or more of said terminal stations to a communications channel, the allocation processor being configured to determine a list of terminal stations available for allocation, initially each terminal station identified in the list being that terminal station, for each base station, with the highest performance capability in its associated base station of the terminal stations identified in the stored information, the allocation processor being further configured to identify a terminal station from the list on the basis of a selection criterion, to allocate that identified terminal station to a communications channel, and thereafter to modify the list to remove therefrom the allocated terminal station and, if the allocated terminal station is in the first classification, to modify the list to take account of any terminal station identified in the list which, on the basis of the stored interference risk information, presents an interference risk to the allocated terminal station.

2. A controller in accordance with claim 1 wherein the selection criterion is the utility measure, the allocation processor thereby being operable to select, for allocation, a terminal station with a highest utility measure, of the stored utility measures.

3. A controller in accordance with claim 1 wherein the selection criterion is prior allocation of terminal stations, the allocation processor thereby being operable to select a terminal station associated with a base station having fewest communications channels allocated to terminal stations, out of the base stations subject to consideration.

4. A controller in accordance with claim 1 wherein the selection criterion is the classification information, the allocation processor thereby being operable to select a terminal station classified in the first classification in priority over a terminal station classified in the second classification.

5. A controller in accordance with claim 1 wherein the allocation processor is operable, in selecting a terminal station in the first classification, to exclude from the list any terminal station associated with a base station identified as presenting an interference risk to the selected terminal station.

6. A controller in accordance with claim 1 operable to signal, in selecting a terminal station classified in the first classification, to lower the transmit power of base stations identified as presenting an interference risk to the selected terminal station.

7. A controller in accordance with claim 1 comprising a receiver operable to receive base station messages from each base station in the network, each base station message comprising classification information, utility information, and interference risk information for a terminal station associated with that base station.

8. A controller in accordance with claim 1 wherein the memory is operable to store information for every terminal station in the network.

9. A controller in accordance with claim 1 wherein the memory is operable to store information, for each base station, for a single terminal station associated with that base station, that single terminal station being that with the utility information reflecting highest performance measure for that base station.

10. A method of controlling communication in a cellular wireless communications network comprising a plurality of base stations, each base station of the network defining a cell wherein abuse station is capable of effecting wireless communication with terminal stations located within the cell associated with that base station, each base station being capable of effecting wireless communication with an associated terminal station on a communication channel of a plurality of communication channels defined in a wireless communication medium, the method comprising:
    storing, for each base station, terminal station information for one or more terminal stations associated with that base station, the terminal station information comprising classification information identifying a classification of the terminal station, the classification being one of a first classification associated with an edge region of its associated cell, or a second classification associated with a central region of its associated cell, utility information for the terminal station, the utility information describing performance capability of that terminal station, and, if the classification information is indicative of the first classification, further storing interference risk information identifying any of the other base stations that present an interference risk to the performance of the terminal station;
    allocating one or more of said terminal stations to a communications channel, the allocating comprising determining a list of terminal stations available for allocation, initially each terminal station identified in the list being that terminal station, for each base station, with the highest performance capability in its associated base station of the terminal stations identified in the stored. information, identifying a terminal station from the list on the basis of a selection criterion, allocating that identified terminal station to a communications channel, and thereafter modifying the list to remove therefrom the allocated terminal station and, if the allocated terminal station is in the first classification, modifying the list to take account of any terminal station identified in the list which, on the basis of the stored interference risk information, presents an interference risk to the allocated terminal station.

11. A method in accordance with claim 10 wherein the selection criterion is the utility measure, the selecting thereby being of a terminal station with a highest utility measure, of the stored utility measures.

12. A method in accordance with claim 10 wherein the selection criterion is prior allocation of terminal stations, the selecting thereby being of a terminal station associated with a base station having fewest communications channels allocated to terminal stations, out of the base stations subject to consideration.

13. A method in accordance with claim 10 wherein the selection criterion is the classification information, the selecting thereby being of a terminal station classified in the first classification in priority over a terminal station classified in the second classification.

14. A method in accordance with claim 10 comprising, in selecting a terminal station in the first classification, excluding from the list any terminal station associated with a base station identified as presenting an interference risk to the selected terminal station.

15. A method in accordance with claim 10 and comprising, in selecting a terminal station classified in the first classification, signalling to lower the transmit power of base stations identified as presenting an interference risk to the selected terminal station.

16. A method in accordance with claim 10 comprising receiving base station messages from each base station in the network, each base station message comprising classification information, utility information, and interference risk information for a terminal station associated with that base station.

17. A method in accordance with claim 10 comprising storing information for every terminal station in the network.

18. A method in accordance with claim 10 comprising storing information, for each base station, for a single terminal station associated with that base station, that single terminal station being that with the utility information reflecting highest performance measure for that base station.

19. A non-transitory computer readable storage medium comprising computer executable instructions which, when executed. on a computer, cause the computer to perform a method in accordance with claim 10.

* * * * *